Patented Nov. 6, 1934

1,979,260

UNITED STATES PATENT OFFICE 1,979,260

MIXED SYNTHETIC OIL AND PRODUCT DERIVED THEREFROM

Chester G. Gauerke, Wilmington, Del., assignor to E. I. du Pont de Nemours & Company, Wilmington, Del., a corporation of Delaware No Drawing. Application April 8, 1932, Serial No. 604,124

3 Claims. (Cl. 260—8)

This invention relates to mixed synthetic oils and to resinous materials and coating compositions made therefrom.

This invention has as an object the production of mixed synthetic oils which combine the advantages of frosting and non-frosting oils while avoiding the disadvantages attending the use of these last mentioned oils alone or mixed. A further object resides in a process for making these oils. A still further object is the utilization of these synthetic oils in the manufacture of resinous materials and coating compositions. Other objects will appear hereinafter.

The reference to a "frosting" drying oil as used herein is intended to designate in general those drying oils which exhibit the characteristic property of frosting, either alone or in an oleoresinous varnish. A "frosting" drying oil, as understood in the varnish trade, is an oil such as China wood oil, Japanese wood oil, or oiticica oil, which is characterized by the property of drying to a flat opaque film.

In the practice of my invention I make the mixed synthetic oils, which are the mixed acid esters of polyhydric alcohols, by esterifying a portion, but not all, of the hydroxyl groups of a polyhydric alcohol with fatty acids of a frosting oil, and esterifying the remaining hydroxyl groups with fatty oil acids other than those obtained from a frosting oil. For convenience I designate these second mentioned acids as those obtained from a non-frosting oil which may be a fatty oil of the drying, semi-drying, or non-drying type exemplified by linseed oil, chia oil, safflower oil, sunflower seed oil, perilla oil, soya bean oil, rubber seed oil, cottonseed oil, or sardine oil.

Polyhydric alcohols having more than two hydroxyl groups, such as glycerol, sorbitol, or pentaerythritol, etc., may be used in the present process. In accordance with the preferred method of carrying out the invention, I use glycerol as the polyhydric alcohol and prepare the China wood oil acid mono- or di-glyceride, or mixture thereof, by heating the alcohol and oil together in the presence of an esterification catalyst favoring the formation of glycerides lower than the tri-glyceride, and then esterify these lower glycerides with fatty oil acids by heat treatment. Thus, by the process of my invention a mixed synthetic glyceride of China wood oil acids and linseed oil acids, for example, is prepared by heating China wood oil with glycerol in the presence of a catalyst such as litharge or other basic oxide (about .05% of litharge on the basis of the oil used) to bring about the formation of mono- and di-China wood oil acid glycerides, or mixtures thereof, and heating the reaction product thus formed with the free fatty acids from linseed oil. Mixed esters based on other polyhydric alcohols, oils, and oil acids, such as are indicated above, are prepared by the same procedure.

During the heating of the drying oil and glycerol (or other polyhydric alcohol) for the production of, in the case of glycerol, mono- and di-acid glycerides, the temperature is preferably within the range of 225–250° C. Any other temperature which will bring about the desired reaction, such as 200° or 275° C. may also be used. The preferred range for the esterification of the mono- and di-acid glycerides is 200° C. to 275° C. Below 200° C. the reaction takes place too slowly and temperatures above 275° C. give rise to excessive darkening and make it more difficult to control the viscosity of the product. It is to be understood, however, that any temperature which will bring about the esterification of the free hydroxyl groups may be used, and that this temperature may vary depending upon the particular alcohol used.

The following is an example of a mixed acid glyceride containing equal parts of China wood oil acids and of linseed oil acids:

EXAMPLE I (a) *Composition*

China wood oil____ 4356 grams (4½ mols)
Glycerol _____ 423 grams (4½ mols)
Linseed oil acids__ 4185 grams (13½ mols or the equivalent of 4½ mols as oil)
Litharge— .05% based on China wood oil content (b) *Preparation*.—Heat the China wood oil and glycerol to 200° C. in a closed reaction vessel fitted with a reflux condenser, sealed mechanical stirrer, and thermometer; add litharge, heat to 250° C., and hold at 250° C. for 20 minutes or until a homogeneous product is obtained. Then add the linseed oil acids and continue heating at 250° C. for 9–14 hours or until an acid number of 2–3 is obtained, the reaction vessel being fitted with a mechanical stirrer, thermometer, and inlet tube to permit blowing with carbon dioxide, and an exit tube to permit the escape of water vapor. In like manner, a mixed acid glyceride containing the China wood oil acids and the linseed oil acids in any desired proportion can be prepared by varying the amounts of China wood oil, glycerol and linseed oil acids accordingly.

The above mixed drying oil acid glycerides are not only equal in film properties to heat treated mixtures of ordinary China wood oil and linseed oil, or other drying and semi-drying oils, but they are also more resistant to gelation during heat treatment and to "frosting" during drying. For example, the 1:1 mixed synthetic China wood-linseed glyceride prepared as indicated above can be heat treated at 250° C. for 1½–2 hours after an acid number of 2.2 and a viscosity of approximately 105 poises are obtained without gelation taking place, while a 1:1 mixture of ordinary China wood and linseed oils having an acid number of 2.5 gels in about 10 minutes at 250° C. after a viscosity of approximately 105 poises is obtained.

As regards "frosting" tendencies, the synthetic oil after dilution with mineral spirits to a brushing viscosity and the addition of 0.03% of cobalt (based on oil content) dries perfectly clear in the "gas oven" (described below), while a corresponding heat treated mixture of ordinary China wood and linseed oil (1:1) of the same viscosity as the synthetic oil after dilution with mineral spirits to brushing viscosity and the addition of the same amount of drier, frosts in the gas oven.

As an alternative method which I may use with good result, I reverse the procedure of Example I and first alcoholize linseed oil with glycerol and esterify the product with China wood oil acid. The method of Example I, together with this reversed procedure, illustrate my preferred method of preparing the mixed synthetic ester of glycerol or other polyhydric alcohol.

Other methods of preparing the mixed glyceride incur some sacrifice of advantage either as to the process or quality of product.

The method of Example I has the advantage that the end-point of the alcoholysis reaction is readily observed, whereas this is not the case when the first step is acid interchange instead of alcoholysis. The method disclosed in the example has the advantage over esterification with the free mixed acids of the two oils in that only a portion of the fatty acids need be provided in the form of free acid.

In general, the properties of the products obtained vary considerably in accordance with the method of preparation, and while the products of the alternative methods are not equal in drying properties to those of products obtained by Example I, they are in all cases superior in drying properties to those products of the prior art containing equivalent proportions of raw materials but involving simple mixtures of the natural oils instead of the synthetic mixed esters.

While this invention has as one of its primary objects the production of synthetic oils which combine the advantages of frosting and of non-frosting oils, I wish to point out that mixed glycerides of the acids of non-frosting drying oils on the one hand, e. g., linseed oil, perilla oil, etc., with the acids of non-frosting semi-drying or non-drying oils on the other hand, e. g., soya bean oil, sardine oil, cottonseed oil, etc., likewise possess advantages over simple mixtures of the oils in question. Thus a mixed synthetic glyceride containing equal amounts of linseed oil fatty acids and soya bean oil fatty acids prepared as under Example I above by heating 4½ mols of linseed oil with 4½ mols of glycerol, and completing the esterification by heating with 13½ mols of soya bean oil acids, dries more rapidly than does a simple mixture of equal amounts of linseed oil and soya bean oil subjected to the same heat treatment as is incident to the preparation of the mixed glyceride. Such mixed glycerides of non-frosting oils, because of their good drying properties, together with the distensibility of their films on drying, are of particular value either as such in paints and varnishes, e. g., a composition of the type shown under Example 2 below, or as modifying agents for polybasic acid-polyhydric alcohol type resins of the type shown under Example III below.

I have also discovered that synthetic mixed oils when combined with resins or when incorporated as an ingredient of a synthetic resin, such as a polyhydric alcohol-polybasic acid resin, produce resinous materials and varnishes which are superior to those obtained from the natural oils. A mixed synthetic oil and a natural or synthetic resin may be combined and an oleoresinous varnish prepared as follows:

1. Prepare the synthetic mixed glyceride by the procedure given above, the fatty acid radicals involved containing, for example, at least 33% of those derived from linseed oil, and the remainder consisting of the acid radicals of China wood oil. Instead of linseed oil acids, soya bean oil acids, perilla oil acids, sardine oil acids, or cottonseed oil acids may be used, and the China wood oil acids may be replaced by Japanese wood oil acids or oiticica oil acids.

2. Heat treat the synthetic mixed glyceride with any synthetic or natural resin used in varnish making, such as ester gum, Congo ester, an oil-soluble phenol-formaldehyde (bakelite) resin or a rosin-modified phenol-formaldehyde (Amberol) resin at 200–275° C. until after reducing with solvents to give the desired solids content, a varnish of working viscosity is obtained. It is to be understood, however, that any other temperature which will give a clear, homogeneous product may be used. After reducing with solvent, the desired quantity of driers are added.

Oleoresinous varnishes, particularly those containing substantial amounts of China wood oil, prepared by the above method are more resistant to gelation during cooking, and to "frosting" on drying than are corresponding varnishes prepared in the old way by heat-treating a mixture of the natural oils, e. g., China wood oil and linseed oil, with a varnish resin.

The following is an example of a forty-gallon ester gum varnish made with synthetic oil:

EXAMPLE II

Synthetic (1:1) China wood-linseed
  oil of Example I_____ 391 grams
Ester gum_____ 125 grams
Mineral spirits_____ 516 grams
Cobalt liquid drier_____ .03% cobalt on basis
                             of oil content.

The varnish is made from these ingredients as follows: Heat the synthetic China wood-linseed oil with ester gum to 250° C. in 30 minutes and hold at 250° C. for 3½ to 4 hours or until a varnish of brushing viscosity is obtained after addition of the required amount of thinner. Drier may be added with thinner or subsequent to thinning.

The above varnish is not only equal in film properties to a forty-gallon ester gum varnish prepared from ester gum and a heavy bodied 1:1 mixture of ordinary China wood and linseed oil, but it is markedly more resistant to gelation and frosting. For example, a forty gallon ester gum varnish prepared from the synthetic oil having an acid number of 2.2 and a viscosity of approximately 105 poises at 25° C. gels only after heating for seven hours at 250° C., while the forty-gallon ester gum varnish prepared from a heat treated 1:1 mixture of ordinary China wood oil and linseed oil having substantially the same viscosity and acid number, gels in one hour at 250° C. In addition, the forty-gallon synthetic oil ester gum varnish dries perfectly clear in the standard gas oven while the corresponding forty-gallon varnish prepared from ester gum and heat treated 1:1 mixture of ordinary China wood and linseed oils, frosts in the standard gas oven. Besides the 1:1 China wood-linseed synthetic oil used above, a 2:1 China wood-linseed synthetic oil or synthetic oils containing China wood oil acids and other drying or semi-drying oil acids may be used. Instead of China wood oil, Japanese wood oil, or oiticica oil may be used, and the ester gum may be replaced by any desired varnish resin.

With reference to the utilization of the synthetic oils in the synthesis of synthetic resins, it is possible to make oil modified synthetic resins of the polyhydric alcohol-polybasic acid type by the use of the mixed acid glycerides prepared by my new process in which a part of the fatty oil acid radicals involved are obtained from the class of drying oils such as linseed oil, perilla oil, sardine oil, or soya bean oil and the remainder of the fatty oil acid radicals are obtained from the class of drying oils which are characterized by their property of drying to a flat and opaque film, such as China wood oil, Japanese wood oil, or oiticica oil. For the preparation of an improved oil modified synthetic resin of the polyhydric alcohol-polybasic acid type by my new process the procedure is as follows:

1. Prepare the mixed glyceride by the procedure of Example I or by one of the alternative methods given above, the fatty acid radicals being derived in part from non-frosting oils such as linseed, perilla, soya bean or sardine, and in part from frosting oils such as China wood, Japanese wood, or oiticica. Instead of glycerol, other polyhydric alcohols may be used, such as ethylene glycol and higher homologs such as propylene glycol, diethylene glycol and other polyglycols, pentaerythritol, sorbitol, polyvinyl alcohol, or triethanolamine.

2. Heat the mixed-acid glyceride obtained in (1) above with glycerol in the presence of a basic oxide catalyst, such as litharge (.05% on the basis of the oil used) to realcoholize the mixed acid glyceride. Instead of glycerol any other polyhydric alcohol, such as those indicated above, may be used.

3. Heat the partially esterified polyhydric alcohol formed in (2) above with an organic polybasic acid, such as phthalic anhydride, to esterify the free hydroxyl groups. It is to be understood that other polybasic organic acids may be used, such as succinic, adipic, sebacic, fumaric, tartaric, citric, dilactylic, chlor-phthalic, diphenic, naphthalic, or pyromellitic acid.

For the production of a varnish from the synthetic resin obtained in (3) above, reduce the resin with any varnish solvent or mixtures of solvents, such as aliphatic or aromatic hydrocarbons (e. g. gasoline or benzol), turpentine, monoethyl ether of ethylene glycol, butyl acetate, butyl alcohol, or methyl ethyl ketone, to the desired viscosity and solids content and add driers, such as cobalt linoleate, lead resinate or manganese resinate dessolved in mineral spirits or other suitable solvent.

The varnishes prepared from these resins are definitely more resistant to "frosting" than are varnishes prepared from corresponding resins prepared in the old way. For example, a varnish based on a polyhydric alcohol-polybasic acid type resin modified by the presence of the equivalent of 57% oil (the oil is not, of course, present as such) consisting of 50 parts of China wood oil and 50 parts of linseed oil, such resin having been made in the old way "frosts" under the conditions of the "gas-test" and "draft-test" whereas the corresponding varnish based on a resin prepared by my process and having the same ultimate composition as the varnish made by the old method, dries to a clear film both under the conditions of the "gas-test" and "draft-test". (A varnish is said to be "gas-proof" if it shows no "frosting" in the "gas-oven" test, i. e., gives a clear, smooth film when allowed to dry under a bell-jar in the atmosphere created by allowing a kerosene lamp to burn to extinction under the bell-jar. Similarly, a varnish is said to be "draft-proof" if films of the varnish show no "frosting" when dried in the direct breeze created by an electric fan, at a distance of about three feet from the fan).

The following specific example illustrates the preparation of a 57% oil modified polyhydric alcohol-polybasic acid resin containing equal portions of China wood oil and linseed oil:

Example III

2:1 China wood-linseed synthetic oil__ 343 grams
Linseed oil_____ 114 grams
Litharge_____ .05% based on oil content
Glycerol_____ 103 grams
Phthalic anhydride_____ 240 grams
Thinner_____ 997 grams
Cobalt liqu'd dried____ .03% based on oil content Any suitable thinner, such as benzol, toluol or a mixture thereof in mineral spirits may be used.

The preparation of the resin from these ingredients is as follows:

Heat the synthetic oil, glycerol and linseed oil to 225° C. in a closed reaction vessel fitted with a sealed mechanical stirrer, a reflux condenser and thermometer. Add the litharge and hold at 225° C. for one hour or until an optically homogeneous reaction product is obtained. Then add the phthalic anhydride and continue the heat treatment while blowing with carbon dioxide in a reaction vessel fitted with a stirrer, thermometer, inlet tube to permit blowing with carbon dioxide, and an exit tube. The reaction mixture is heated for about three hours, or until an acid number of about 36-40 is reached.

When the resin was reduced with thinner and drier added after the varnish has cooled to room temperature, the resulting spar varnish was found to be "gas-proof" and "draft-proof" while a corresponding varnish prepared from a 1:1 mixture of ordinary China wood oil and linseed oil, glycerol and phthalic acid fails in the gas-test and draft-test. Instead of glycerol, any other polyhydric alcohol, such as glycol or pentaerythritol may be used, and instead of phthalic acid any other organic dibasic acid such as succinic acid or diphenic acid may be employed. Besides China wood oil, Japanese wood oil, or oiticica oil may be used, and the linseed oil may be replaced by any other drying or semi-drying oil such as perilla, soya bean, or sardine.

The above described methods of preparing the mixed glycerides and incorporating these into the polyhydric alcohol-polybasic acid resins involve four main steps which may be recapitulated as follows:

1. A drying oil is alcoholized by heating with a polyhydric alcohol and an esterification catalyst.

2. The alcoholized product of (1) is esterified by heating with the free acid obtained by the hydrolysis of a second natural glyceride.

3. The mixed glyceride from (2) is re-alcoholized by heating with a polyhydric alcohol and an esterification catalyst.

4. The alcoholized product from (3) is esterified by heating with a dicarboxylic acid.

For most purposes I prefer to use the above four-step process in preparing the new resins but, as a modification, it is satisfactory for some uses to prepare the resin by a three-step process as follows:

1. A drying oil is alcoholized by heating with a polyhydric alcohol and an esterification catalyst, the polyhydric alcohol being used in sufficient excess so that no additional alcohol need be added in the subsequent steps of making the resin.

2. The mixed glyceride from (1) is esterified with the desired proportion of the free acid obtained by hydrolysis of a second natural oil to obtain a product containing the desired proportion of free hydroxyl.

3. The product from (2) is esterified by heating with a dicarboxylic acid.

The resins obtained by this alternative method are superior in drying properties to those prepared using mixtures of natural oils but without the advantage of the mixed synthetic glyceride as the intermediate product; however, they are in general less resistant to the gas-test than are those prepared by the preferred four-step process, that is in accordance with the method of Example I combined with Example III.

By suitable variations in the proportions of ingredients used, I prepare by the above described methods resins of good quality containing the equivalent of from 30-70% of weight of oil based on the resin, and of the oil acids present in the resin I prefer to keep the proportion of frosting oil acid, e. g., China wood oil acid, not less than 33% and not more than 50% of the total oil acids. Resins of this composition, when made by the process described above, may be used in a varnish which, when flowed out on a glass plate and dried under atmospheric conditions for from one to five minutes, dry to a clear film when tested under the bell-jar.

As an esterification catalyst for the preparation of the mixed glycerides and for the introduction of these into resins, I prefer to use a basic oxide such as oxide of lead, sodium, calcium, barium, zinc, magnesium, or the like.

The improved resins of the type described above are used with pigments in the usual way for the manufacture of improved enamels, paints, etc.

As many apparently widely different embodiments of this invention may be made without departing from the spirit and scope thereof, it is to be understood that I do not limit myself to the specific embodiments thereof except as defined in the following claims:

I claim:

1. A process which comprises heating a polyhydric alcohol containing more than two hydroxyl groups with a frosting drying oil and heating the partially esterified alcohol with the fatty oil acids obtained from a non-frosting oil, re-alcoholizing the mixed acid ester by heating with a polyhydric alcohol, and heating the partially esterified polyhydric alcohol with a polybasic acid until resinification occurs.

2. A process which comprises heating glycerol with China wood oil in the presence of a catalyst favoring the formation of China wood oil glyceride lower than the triglyceride, heating the reaction products with the fatty oil acids obtained from a non-frosting oil, re-alcoholizing the mixed acid glyceride by heating with glycerol and heating the glyceride thus obtained with phthalic anhydride until resinification occurs.

3. A process which comprises partially esterifying a polyhydric alcohol containing more than two hydroxyl groups by heating it with a substance containing the acid radicals of a fatty oil acid, and heating the partially esterified alcohol with a second substance containing the acid radicals of a fatty oil acid other than said first mentioned radicals, alcoholizing the mixed ester thus obtained by heating it with a polyhydric alcohol, and heating the partially esterified alcohol resulting from the alcoholysis with a polybasic acid until resinification occurs.

CHESTER G. GAUERKE.

---

CERTIFICATE OF CORRECTION.

Patent No. 1,979,260. November 6, 1934.

CHESTER G. GAUERKE.

It is hereby certified that error appears in the printed specification of the above numbered patent requiring correction as follows: Page 3, line 71, for "dessolved" read dissolved; and line 112, for "dried" read drier; and in the same line, after ".03%" insert the word cobalt; page 4, line 44, for "of" second occurrence read by; and that the said Letters Patent should be read with these corrections therein that the same may conform to the record of the case in the Patent Office.

Signed and sealed this 5th day of February, A. D. 1935.

Leslie Frazer

Acting Commissioner of Patents.

(Seal)

four main steps which may be recapitulated as follows:

1. A drying oil is alcoholized by heating with a polyhydric alcohol and an esterification catalyst.
2. The alcoholized product of (1) is esterified by heating with the free acid obtained by the hydrolysis of a second natural glyceride.
3. The mixed glyceride from (2) is re-alcoholized by heating with a polyhydric alcohol and an esterification catalyst.
4. The alcoholized product from (3) is esterified by heating with a dicarboxylic acid.

For most purposes I prefer to use the above four-step process in preparing the new resins but, as a modification, it is satisfactory for some uses to prepare the resin by a three-step process as follows:

1. A drying oil is alcoholized by heating with a polyhydric alcohol and an esterification catalyst, the polyhydric alcohol being used in sufficient excess so that no additional alcohol need be added in the subsequent steps of making the resin.
2. The mixed glyceride from (1) is esterified with the desired proportion of the free acid obtained by hydrolysis of a second natural oil to obtain a product containing the desired proportion of free hydroxyl.
3. The product from (2) is esterified by heating with a dicarboxylic acid.

The resins obtained by this alternative method are superior in drying properties to those prepared using mixtures of natural oils but without the advantage of the mixed synthetic glyceride as the intermediate product; however, they are in general less resistant to the gas-test than are those prepared by the preferred four-step process, that is in accordance with the method of Example I combined with Example III.

By suitable variations in the proportions of ingredients used, I prepare by the above described methods resins of good quality containing the equivalent of from 30–70% of weight of oil based on the resin, and of the oil acids present in the resin I prefer to keep the proportion of frosting oil acid, e. g., China wood oil acid, not less than 33% and not more than 50% of the total oil acids. Resins of this composition, when made by the process described above, may be used in a varnish which, when flowed out on a glass plate and dried under atmospheric conditions for from one to five minutes, dry to a clear film when tested under the bell-jar.

As an esterification catalyst for the preparation of the mixed glycerides and for the introduction of these into resins, I prefer to use a basic oxide such as oxide of lead, sodium, calcium, barium, zinc, magnesium, or the like.

The improved resins of the type described above are used with pigments in the usual way for the manufacture of improved enamels, paints, etc.

As many apparently widely different embodiments of this invention may be made without departing from the spirit and scope thereof, it is to be understood that I do not limit myself to the specific embodiments thereof except as defined in the following claims:

I claim:

1. A process which comprises heating a polyhydric alcohol containing more than two hydroxyl groups with a frosting drying oil and heating the partially esterified alcohol with the fatty oil acids obtained from a non-frosting oil, re-alcoholizing the mixed acid ester by heating with a polyhydric alcohol, and heating the partially esterified polyhydric alcohol with a polybasic acid until resinification occurs.

2. A process which comprises heating glycerol with China wood oil in the presence of a catalyst favoring the formation of China wood oil glyceride lower than the triglyceride, heating the reaction products with the fatty oil acids obtained from a non-frosting oil, re-alcoholizing the mixed acid glyceride by heating with glycerol and heating the glyceride thus obtained with phthalic anhydride until resinification occurs.

3. A process which comprises partially esterifying a polyhydric alcohol containing more than two hydroxyl groups by heating it with a substance containing the acid radicals of a fatty oil acid, and heating the partially esterified alcohol with a second substance containing the acid radicals of a fatty oil acid other than said first mentioned radicals, alcoholizing the mixed ester thus obtained by heating it with a polyhydric alcohol, and heating the partially esterified alcohol resulting from the alcoholysis with a polybasic acid until resinification occurs.

CHESTER G. GAUERKE.

---

CERTIFICATE OF CORRECTION.

Patent No. 1,979,260. November 6, 1934.

CHESTER G. GAUERKE.

It is hereby certified that error appears in the printed specification of the above numbered patent requiring correction as follows: Page 3, line 71, for "dessolved" read dissolved; and line 112, for "dried" read drier; and in the same line, after ".03%" insert the word cobalt; page 4, line 44, for "of" second occurrence read by; and that the said Letters Patent should be read with these corrections therein that the same may conform to the record of the case in the Patent Office.

Signed and sealed this 5th day of February, A. D. 1935.

Leslie Frazer

Acting Commissioner of Patents.

(Seal)